Patented Dec. 26, 1939

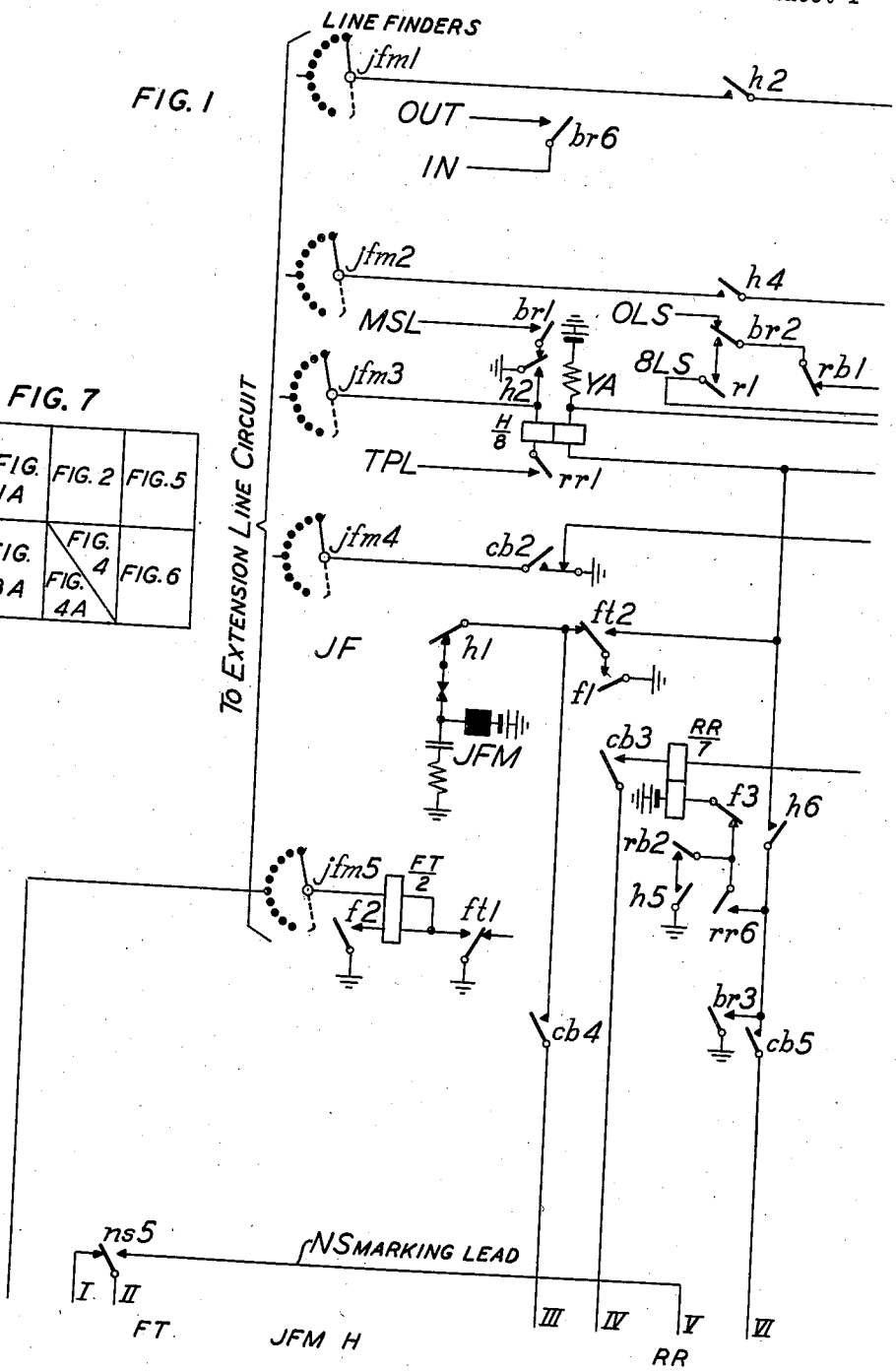

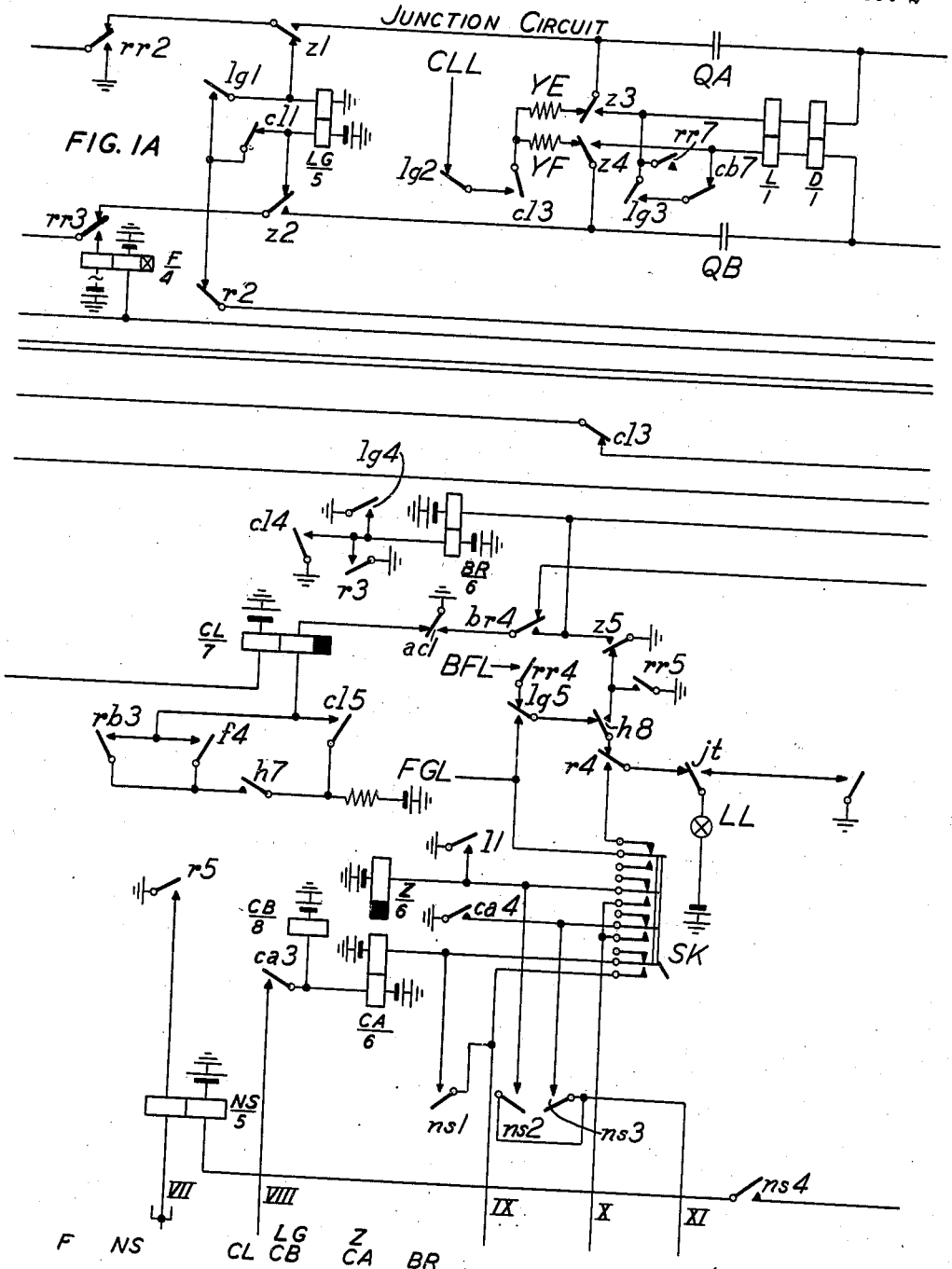

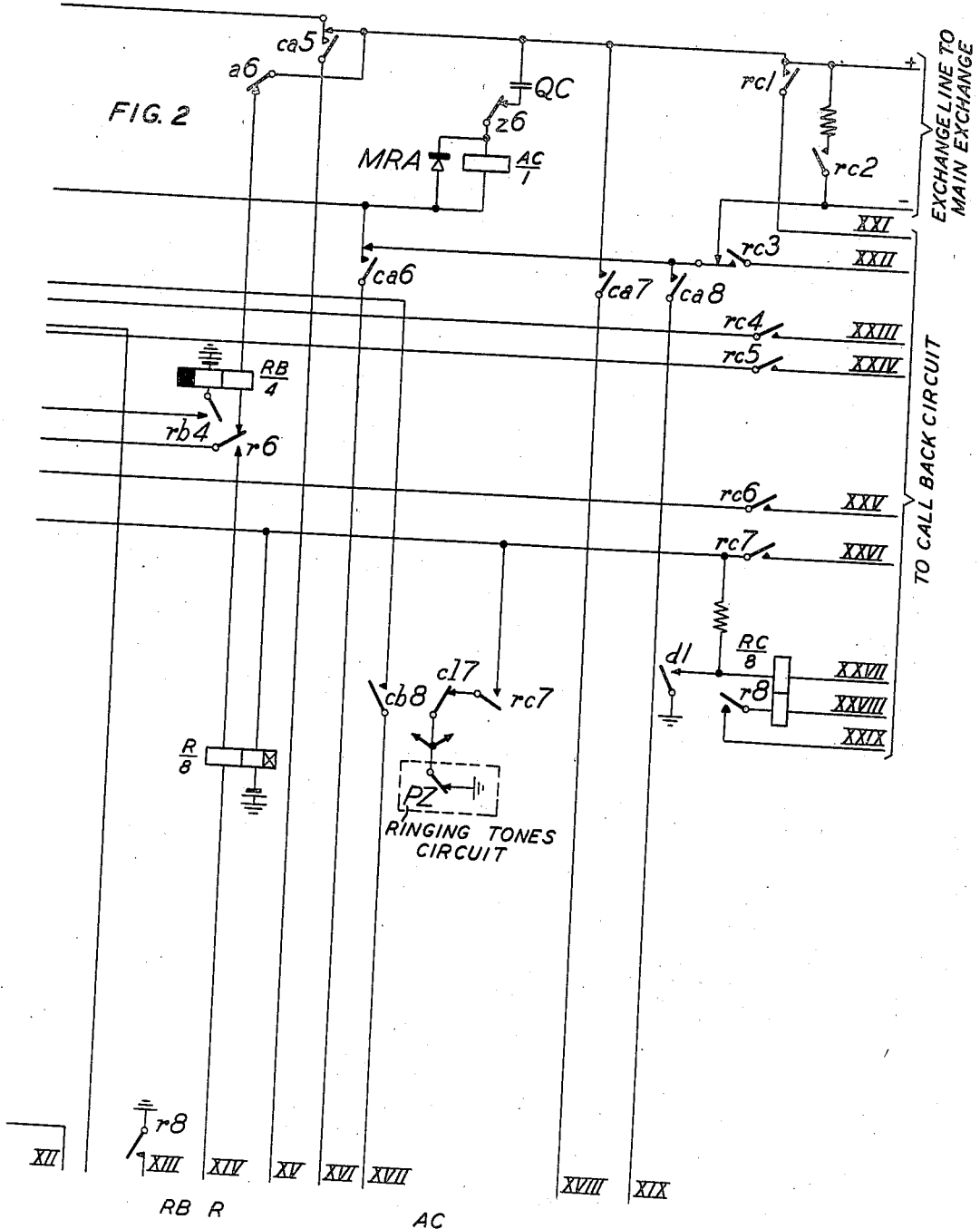

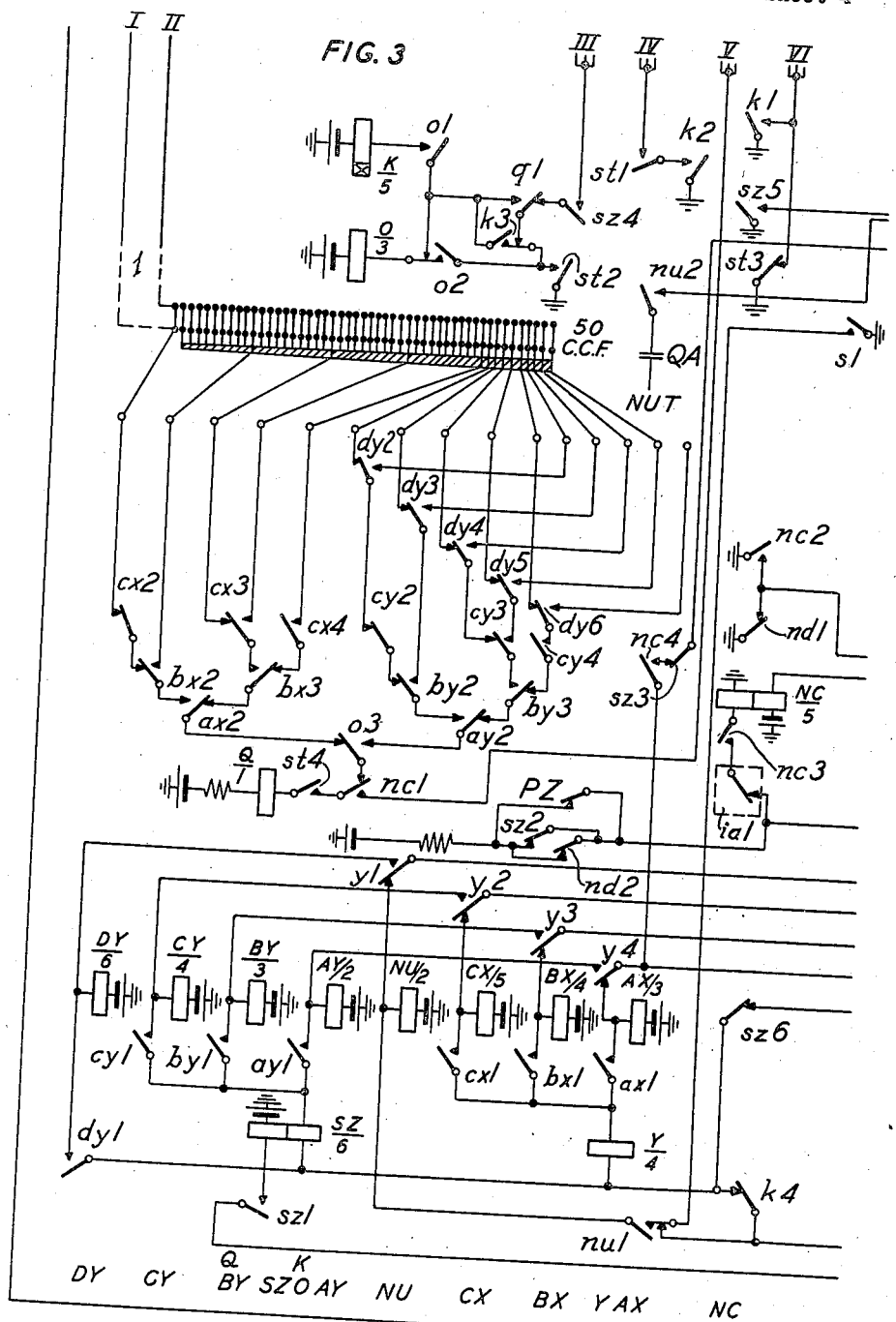

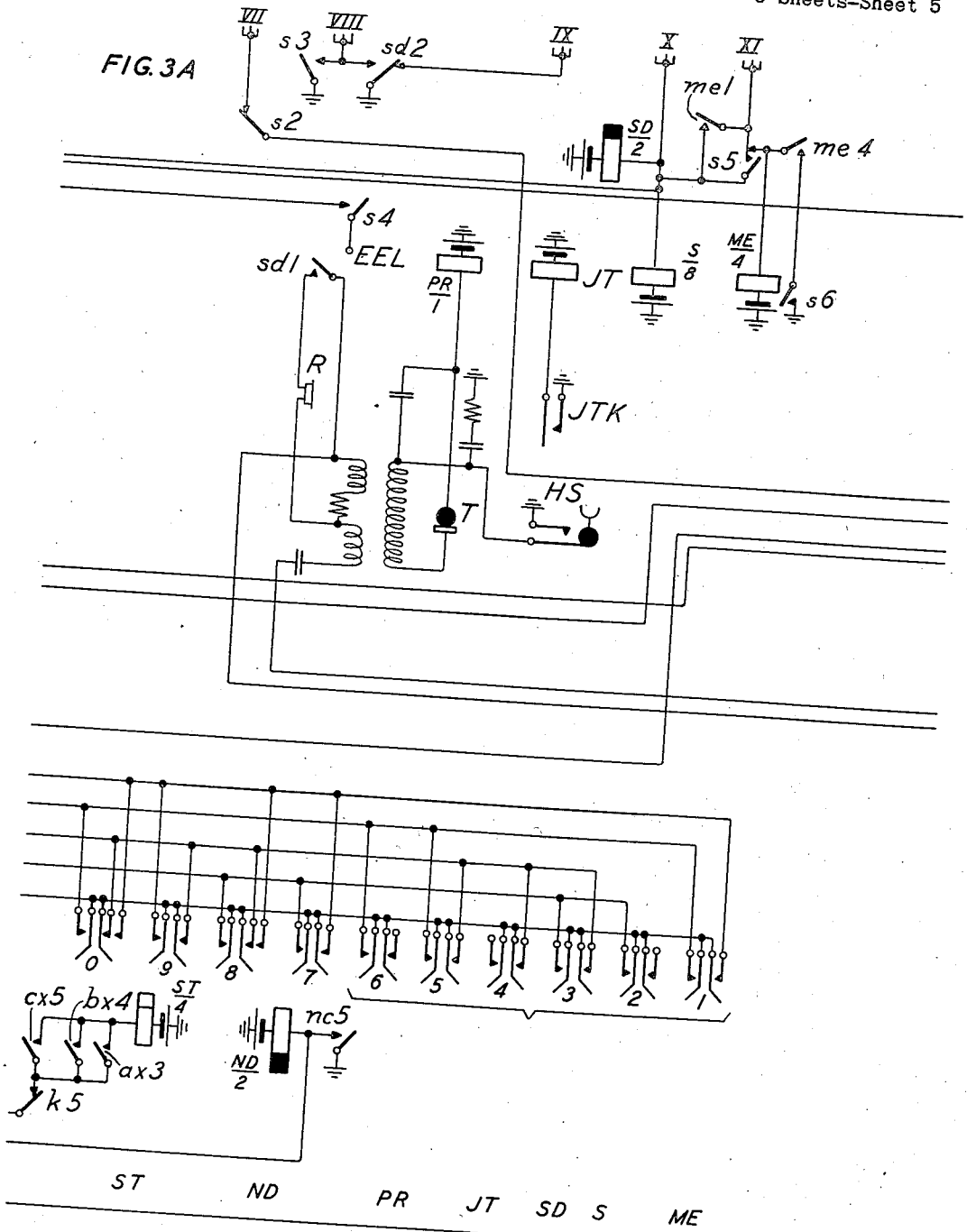

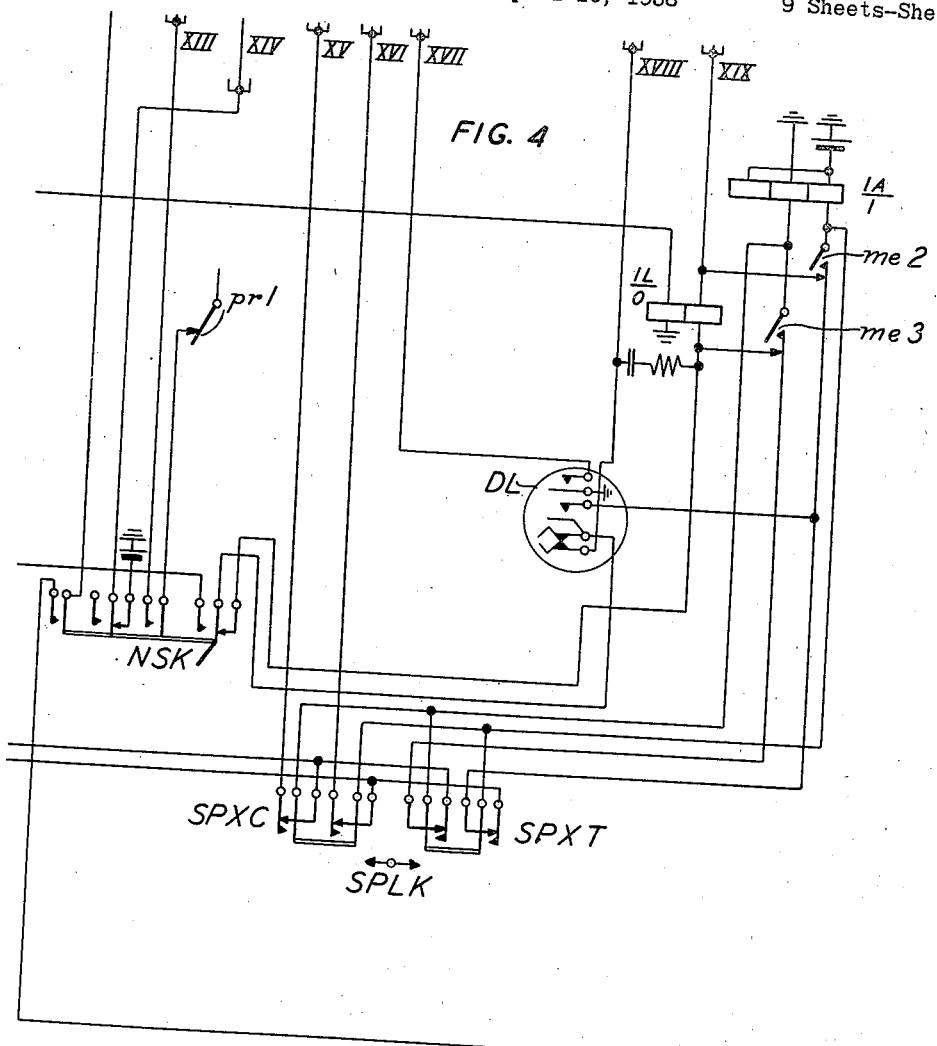

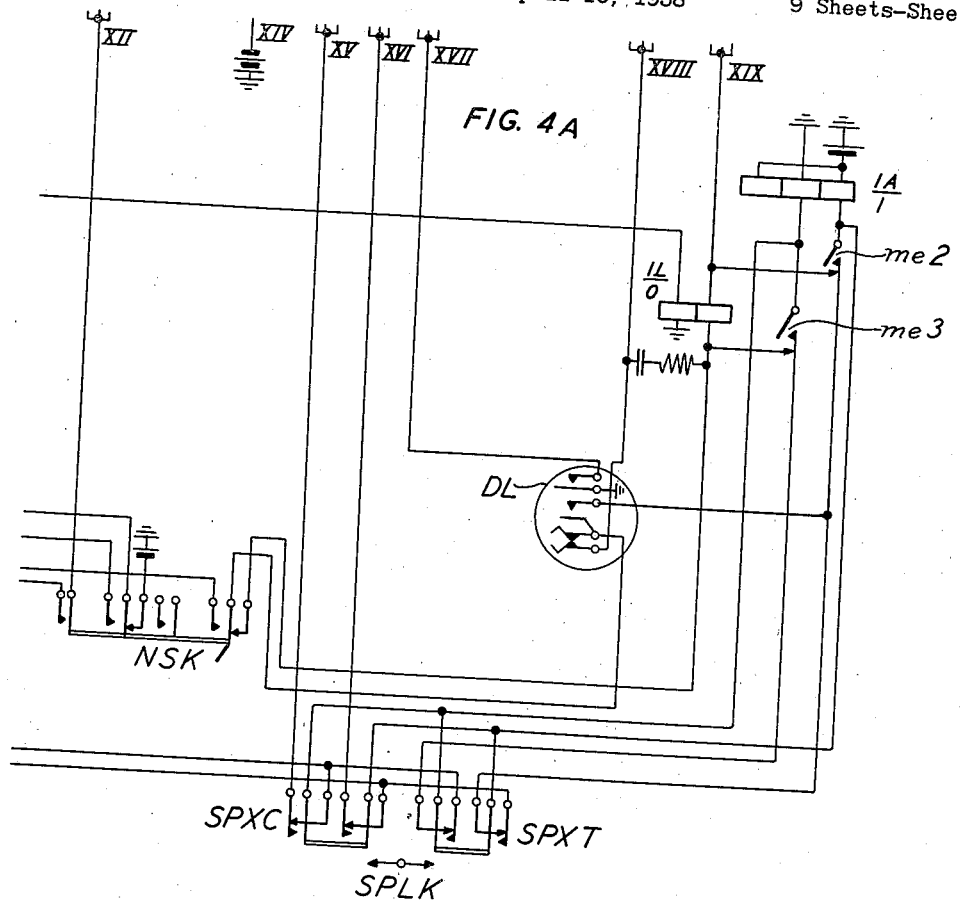

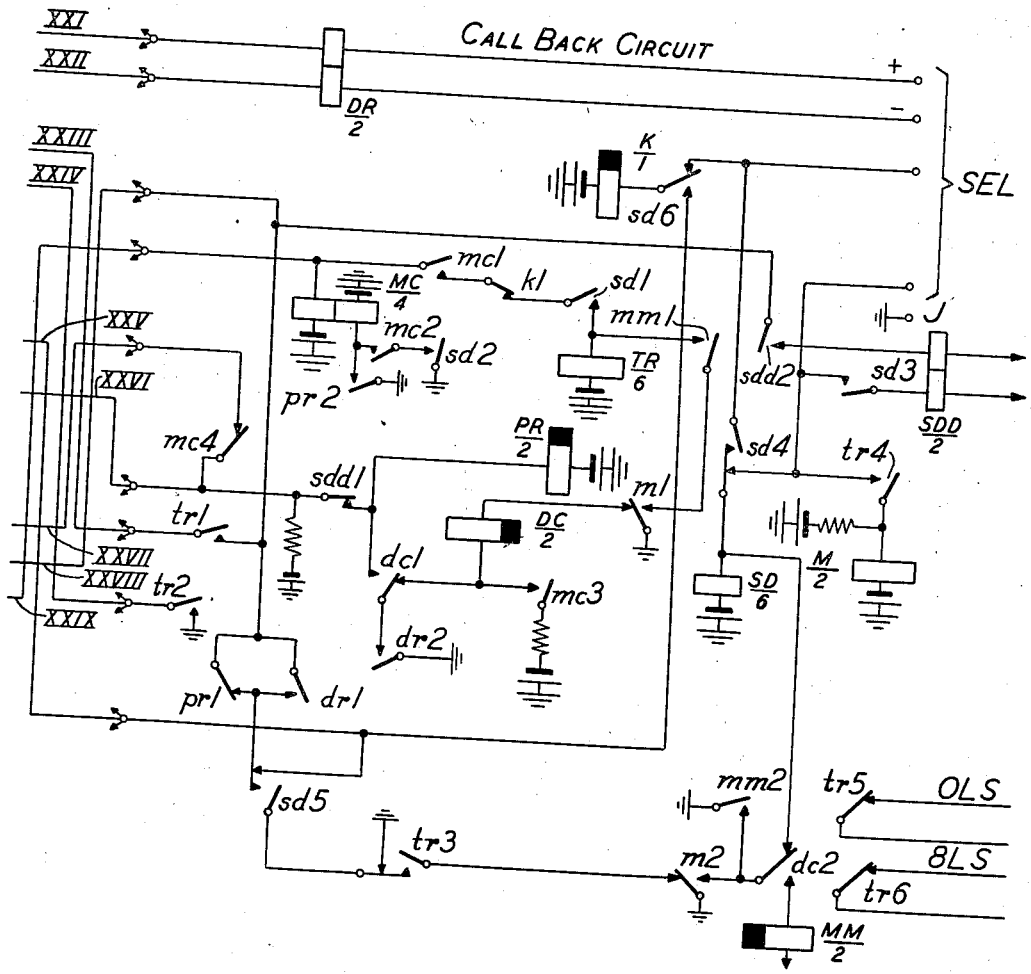

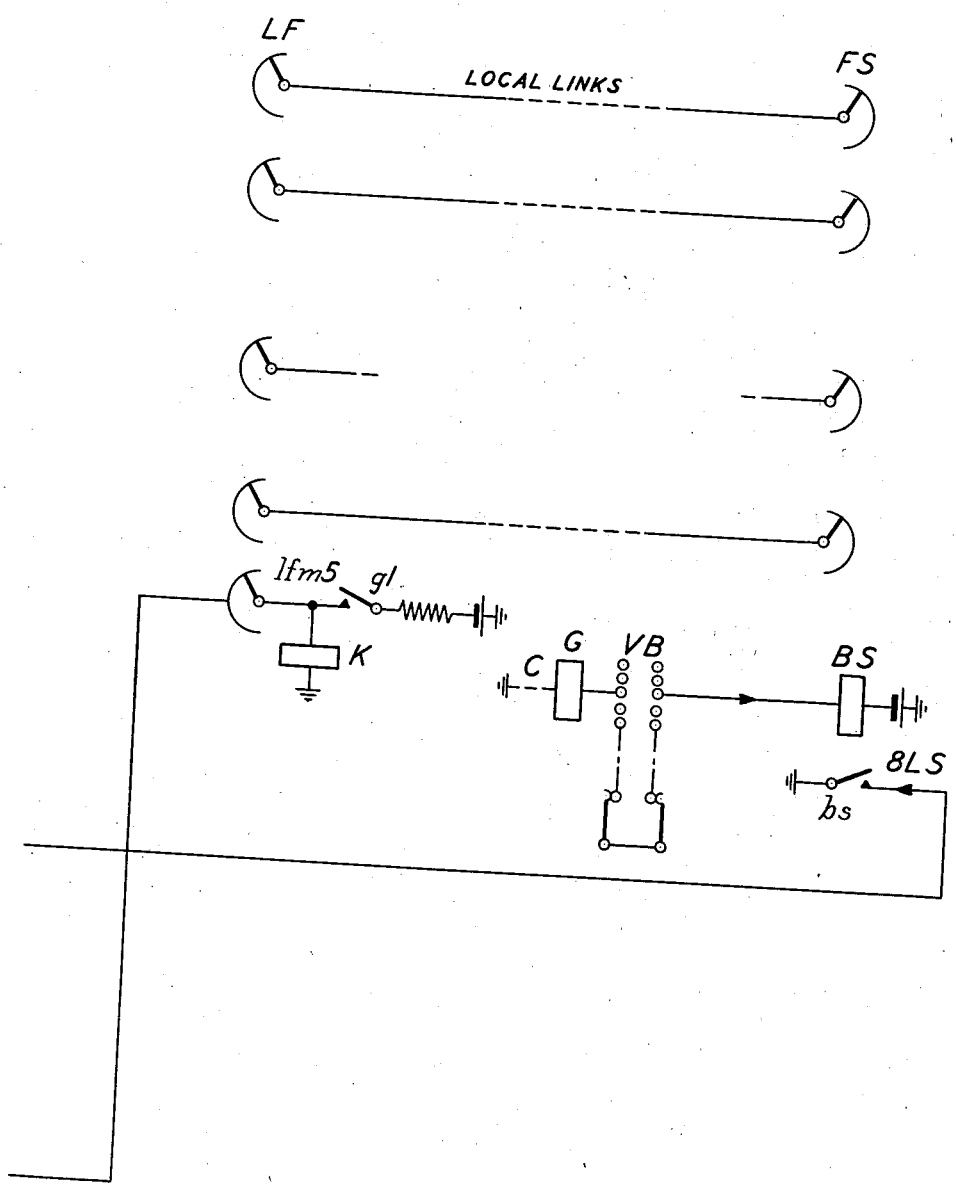

2,184,540

UNITED STATES PATENT OFFICE 2,184,540

PRIVATE BRANCH EXCHANGE SYSTEM

Esmond P. G. Wright and George C. Hartley, London, England, assignors to Western Electric Company, Incorporated, New York, N. Y., a corporation of New York Application April 16, 1938, Serial No. 202,429
In Great Britain August 17, 1937

6 Claims. (Cl. 179—27)

This invention relates to private branch telephone exchange systems in which incoming calls are normally extended by an attendant, but in which so-called "night-service" facilities are provided for extending incoming calls when the attendant's position is unoccupied.

The object of the invention is to provide improved "night-service" facilities.

One feature of the invention comprises a private branch telephone exchange system so arranged that incoming calls are normally dealt with by an attendant, but are automatically switched through to an extension when the attendant's position is vacant and so-called "night-service" conditions are in operation, characterized in this, that while "night-service" conditions are in operation an incoming call causes bells or buzzers to be sounded at suitable points in the building which the exchange serves and can be answered from any extension subset.

Another feature of the invention comprises a private branch exchange characterized in this, while "night-service" conditions are in operation an extension is individually allocated for night service to each junction from the main exchange, and the extension individually allocated to a junction is automatically selected in response to an incoming call over said junction.

The invention will be clearly understood from the following description of an embodiment of the invention shown in the accompanying drawings in which:

Figs. 1, 1A, 2, 3, 3A, 4, 5 and 6 arranged in accordance with Fig. 7 show the applicants' invention applied to an automatic branch exchange system in which "night-service" is provided by having incoming calls cause the operation of bells or buzzers at different points in the buildings which the exchange serves and having any extension subscriber answer the incoming call by dialing the digit 8; Figs. 1, 1A and 2 show an automatic branch exchange junction line circuit terminating in a line finder; Figs. 3, 3A and 4 show a key-sending cordless position equipment; Fig. 5 shows a call-back circuit; and Fig. 6 shows a local link circuit;

Figs. 1, 1A, 2, 3, 3A, 4, 4A, 5 and 6 arranged in accordance with Fig. 7 show the applicants' invention applied to an automatic branch exchange system in which "night-service" is provided by having a particular extension allocated for this service to each junction; Fig. 4A shows the principal changes required for this latter type of service.

The invention will first be described in general in connection with the Figs. 1, 1A, 2, 3, 4, 4A, 5 and 6 and later specifically in connection with the two "night-service" arrangements, using Fig. 4 in the first instance and Fig. 4A in the second instance.

The key-sending equipment comprises a digit key or press-button strip 0—1, Fig. 3A, adapted to control digit storage relay groups AX—CX, and AY—DY. Contacts of the storage relays mark bank $jfm4$, Fig. 1, of the junction line finders via cross-connecting frame CCF. If the number of extension lines is small, a key or press-button per extension line may be provided to mark the junction line finder banks direct.

The attendant's set may be provided with a speak key, SK, Fig. 1A, per junction, but a double-throw key is preferably provided for each pair of junctions.

When a call is made from the main exchange by ringing over a junction to the private automatic branch exchange, relay RB energizes immediately to ringing return battery at the main exchange even during an initial silent period; earth, $cb2$, $r6$, RB, $a6$, and positive junction wire. Contacts $rb1$ open the start circuit from the 0 level and 8 level start leads OLS, 8LS of the local links so as to busy the junction to outgoing calls.

Ringing current operates relay AC; positive wire QC, $z6$, AC, $rc3$, negative wire.

Earth via $ac1$, $br4$, energizes R, which locks on its left-hand winding via $r6$, $cb2$, and on its right-hand winding via $rc1$, $c17$, back contacts of a relay PZ (not shown) in the ringing and tones circuit to earth.

BR now operates and connects flicker ground via FGL, speak key SK of the attendant's circuit, $r4$, back contact of junction test relay JT of the attendant's circuit, to line lamp LL. A buzzer may also be sounded.

Contacts $br1$ connect earth from $h2$, to the ringing and tones machine start lead MSL. Relay PZ is arranged to operate every half minute after the machine has been started to release relay R if the connection has not been completed, and if key NSK in Fig. 4 is thrown.

When the attendant throws the speak key, relay CA operates via SK, lead IX, $sd2$ in the attendant's circuit earth. Relays S, SD in the attendant's circuit operate via lead X, SK, $ca4$. The change-over of contacts $sd2$ renders all other junction speak keys ineffective. CA locks over its lower winding, $ca3$, lead VIII, to contacts $s3$, $sd2$, in the attendant's circuit, and CB operates in parallel with CA. Z energizes via two pairs of SK contacts and $ca4$.

Ringing is tripped via positive junction lead, *ca1*, lead XVIII contacts of DL, NSK, right-hand winding of coil IL, lead XIX, *ca8*, *rc3*, negative junction lead.

The attendant enquires the wanted number; lead XVIII contacts of DL, NSK, *me3*, contacts SPXT of splitting key SPLK, attendant's telephone set, SPXT, *me2*, lead XIX.

Let us assume that the wanted number is 22. The attendant sets up the number on her key-set 1—0. Relay AX only of the storage relay combination AX—CX energizes; AX, *y3*, key 2, *sz6*, *k4*, *nu1*, *s1*. AX locks via *ax1* in series with Y to the same earth. Y energizes and transfers the key leads from relays AX—NU to the second digit storage relay set AY—DY.

It will be noticed that relay N*u*, the fourth relay of the first storage set is connected to keys 1, 7, 8, 9, 0, and when operated thereby, locks direct to *s1*, and opens the energizing circuit for Y in series with relays AX, BX, CX, so as to prevent registration of any one of said digits which are not used as first digits in the private automatic branch exchange. NU tone via lead NUT, *nu2*, and coil IL, is induced in the attendant's receiver.

When a first digit is correctly registered, ST energizes via *ax3* (or *bx4*, or *cx5*), *k5*, *nu1*, *s1*.

The first digit having been registered on AX, key 2 is again depressed and AY is operated and locks in series with SZ which also energizes and disconnects the key-set at *sz6*.

Earth via *st2*, *k3*, *q1*, *sz4*, lead III, *cb4*, *h1*, and its interrupter, energizes magnet JFM of the 50-point single motion junction line-finder switch, which hunts for a marked line.

Contacts 1—50 of the cross connecting frame CCF in the attendant's circuit are connected to the corresponding 50 contacts in the bank of wiper *jfm4*. The group of ten lines including the wanted party is first marked and relay Q operates when the group is found via *st4*, *nc1*, *o3*, *ax2* operated, *bx2*, *cx2*, contact 1 of CCF to the first group of lines on JF *jtm4*, *cb2* to earth.

Operation of *q1* immediately stops JF and also operates O to *st2*. O locks via *o2*, *st2* and changes the connection of Q from the group marking wires to the line marking wires. It is to be understood that the line marking wires are multipled over all the CCF groups.

Q releases and JFM reoperates. When the marked line in the selected group is reached Q energizes via *st4*, *o3*, *aya*, *by2*, *cy2*, *dy2*, *ifm4*, *cb2* to earth. Slow-to-operate relay K now energizes fully via *o1*, *q1*, *k3*, *st2* and locks via *o1*, *k3*, *st2*. The opening of *k5* causes ST to release slowly and the opening of *k4* immediately releases the storage relays AX, AY and relays Y, SZ, Q, K, and O.

Relays CL and RR in series in the junction circuit energize via *cb3*, lead IV, *st1*, *k2*, during de-energization of ST.

RR locks via *f3*, *rr6*, *cb5*, lead VI, *k1* and CL locks; earth *ac1*, CL, *cl5*, battery.

Since both locking circuits for R are now opened at *cb2* and *cl7*, R releases.

If the speak key SK had been returned before the call was properly set up, that is, before R is released, LL would flicker until the speak key was again thrown and the call completed.

Relay H tests the condition of the wanted subscriber's line by means of intermittent potential on lead TPL.

If the line is busy, H does not operate and busy flash is connected via BFL, *rr4*, *lg5*, *h8*, *r4*, contact of JT to LL.

If or when the subscriber is free, H operates and locks via *h6*, *cb5*, lead VI, *st3*, and LL glows steadily in a circuit via JT contacts, *r4*, *h8*, *rr5*. The wanted party is rung, ringing source, winding of F, *rr3*, *h4*, *jfm2*, wanted party's bell, *jfm1*, *h2*, *rr2*, earth.

When the subscriber replies, F operates and at *f3* releases RR which releases F.

When the speak key is return to normal S and SD in the attendant's circuit release, and release CA and CB so that a conversational circuit is completed; junction positive wire, *rc1*, *ca5*, upper windings of D and L, *z3*, *z1*, *rr2*, *h2*, *jfm1*, extension loop *jfm2*, *hr*, *rr3*, *z2*, *z4*, lower windings of L and D, *rc3*, junction negative. Relay L immediately operates and holds Z at L1. The relays now energized are L, Z, H, CL, BR.

The attendant may find it necessary to re-key and so transfer the connection to another line in the following cases:

(1) If the called party is busy, and the calling party asks for another extension.

(2) If there is no reply to ringing and the calling party asks for another extension.

(3) If conversational connection has been set up but transfer is required, for instance, if the call is really for another party.

In all three cases assuming that the speak key is still thrown relays CA, CB, S, SD, CL, BR are energized, but the relays RR and H are differently operated in these three different conditions.

In condition (1), relay RR only is energized.

In condition (2), relays RR and H are both energized.

In condition (3), relay H alone is energized.

Whichever of these two relays RR and H are operated, operation of one of the digit keys in setting up a new number automatically releases the said relay or relays.

The depression of the digit key energizes one or more storage relays AX, BX, CX followed by relays Y and ST as before. The locking circuit for RR and H are via *f3* and *rr6*, and via *h6* in common via *cb5*, lead VI, back to *st3*, to ground. Operation of ST therefore opens both locking circuits and RR and/or H release.

Depression of the second digit key operates one or more storage relays AY—DY and relay Z. As before JF hunts for the marked group and line in turn and the new line is tested and if idle, rung.

When the call is set up the speak key is restored, S, SD, CA, CB release. The attendant's circuit is back to normal and available for dealing with another call, whie in the exchange line circuit, relays L, Z, H, CL, BR, are energized as previously stated.

When the private automatic branch exchange extension hangs up, L releases followed by Z. Clearing alternating current may be applied via lead CLL, *lg2*, *cl3*, YE and YF, *z3* and *z4* in parallel to the junction leads. When the impedance of the two parallel alternating current circuits become unbalanced due to change-over from the conversation feed circuit to the junction line circuit at the main exchange, and relay AC which is bridged across the circuit energizes, change-over of contacts *ac1* releases relay CL but holds BR to prevent R being energized.

Release of CL breaks the clearing circuit at *cl2*, so that AC and BR release. The opening of contacts br3 releases H and the circuit is back to normal.

If the main exchange subscriber holds the connection AC does not energize, and CL, BR, and H remain operated after L and Z are released. Lamp LL is then continuously lighted via JT contact, 44, h8, z5. The private automatic branch exchange attendant on observing the lamp comes in and makes enquiries.

If an extension party engaged on an incoming call from the main exchange wishes to call back to another extension while the main exchange call is held, he depresses a subset button which earths both legs of his line. Differential relay D, Fig. 1, energizes and contacts d1 cause RC to operate via lead XXVII to the call-back circuit, Fig. 5, mc4 to battery.

Earth via z5, Fig. 1, rc6, Fig. 2, lead XXV, sd5, Fig. 5, pr1, lead XXVIII, lower winding of RC, Fig. 2, rc8, lead XXIX, left-hand winding of MC, Fig. 5 to battery, locks RC and energizes MC.

The opening of contacts mc4, Fig. 5, prevents any other RC relays energizing.

The junction line, Fig. 2, is bridged via rc2, to hold the exchange line connection while the extension line is connected via rc1, rc3, via the leads XXI, XXII to the call back circuit in which the said line is connected via a differential relay DR to a spare extension line circuit SEL. While the subset button is still depressed, relay DR is energized.

When DR is released by release of the subset button, relay DC which was short-circuited via dc1, dr2, now energizes; earth m1, DC, mc3, battery.

The calling extension line loop causes the spare line circuit to seize a local link which connects earth to the third wire of SEL to operate K. The extension party now dials into the local link and completes the call-back connection.

The local link is so arranged that after the second digit has been dialed, it puts a resistance earth back on the fourth wire in response to which SD operates. SD locks via sd4, to the third wire of the spare line SEL. SDD now energizes via sd3 and the fourth wire of SEL in series with a relay in the local link which sets up a called party release condition, and locks via sdd2, pr1, sd5, tr3, to earth.

If the extension desires to return to the exchange call he depresses his button again. Relay DR operates and operates relay PR via dc1, dr2. The opening of contacts pr1 transfers the control of relay RC to front contact dr1, so that as soon as DR releases RC will release during the slow release of PR. The release of RC will cause the local link circuit to release, and will restore the exchange line talking condition via rc1, rc3.

If the extension wishes to transfer the call to the second extension he merely replaces his receiver. This will release the L and Z relays of the junction circuit and z5 disconnects earth from XXV thereby releasing relay K. The local link will not release in this condition since it is in the called party release condition. As a consequence of this relay SD will remain operated and when K releases relay TR will operate via sd1, k1, mc1 in parallel with MC. TR connects earth to lead XXIII via tr1, pr1, sd5, tr3, m2 and to lead XXIV via tr2, thereby forcing the release of the exchange line circuit H relay and operating relay F. At the same time TR connects relay M in parallel with a 200 ohm resistance to the fourth wire of the spare line circuit SEL; this is extended via the link to a fourth wiper of the connector switch and serves to mark the called extension on the bank jfm5 of the exchange line finder. JF, Fig. 1, hunts for the marked line; JFM, h1, ft2, f1. When the marked line is found relays M and FT, Fig. 1, will operate, and release RC at m2. When M operates, DC releases slowly. During release of DC, M operates MM which via mm2, dc2, connects earth on the third wire of SEL when DC releases. MM has a long release time and maintains this earth for sufficient time to force the release of the guard relay in the local link. SD is released by the local link and the call-back circuit returns to normal. In the exchange line circuit, H reoperates via ft2, f1, and locks. TR incidentally, disconnects the 8, 9, and 0 level start leads to reserve the multiple exclusively for the use of the call-back circuit during the transfer process.

If the extension wishes to call the attendant he presses his button twice in succession. The first operation establishes the beginning of the call-back condition and relays DC, MC, and K are operated. The second operation without dialing, i. e., prior to the operation of SD extends earth via dr2, dc1, sdd1, lead XXVI, rc7 to relay R in the exchange line. Flicker ground is connected via FGL, SK, r4, JT contacts to flash lamp LL. At the same time PR is operated and releases the call-back circuit as previously described.

The attendants' sets are not permanently attended, and as is usual so-called "night-switching" is provided. This may be provided in either of two ways according to requirements.

In one arrangement, using Fig. 4, throwing of the attendant's night switching key NSK causes buzzers or bells distributed at selected points around the building served by the private automatic branch exchange to be operated when an incoming call arrives. The call can be answered from any extension.

By dialing 8 from an extension to a local link a waiting incoming call is automatically connected to said extension and the local link released.

The call can then be transferred as above to any desired extension.

With the "dial 8" facility wired up in accordance with Fig. 4 and the night service key thrown, an incoming call operates RB, AC, R, and BR, but R does not lock up since battery has been removed from lead XIV by NSK. Earth via r8, lead XIII, NSK, pr1, lead BUL, operates the buzzers.

On reply by an extension, a local link, Fig. 6 is seized and when digit 8 is received by its up and around selector FS, relay G is operated over the vertical bank VB in series with a common relay BS which connects earth to the lead 8LS. As indicated on NSK, this lead is taken through normally open contacts of NSK to prevent an incoming call being taken out of the attendant's hands in this way when the attendant is present.

This earth via 8LS, Fig. 1, r1, br2, rb1, (since RB was released by R) operates F. JFM is operated via its interrupter, h1, ft2, f1, and JF hunts for the answering extension. When this is found FT energizes; earth, f2, FT, jfm5, lfm5, g1, battery. Contacts ft2 stop JF, and contacts ft1 short-circuit the high resistance winding of FT to cause a relay K in the local link which was held via g1 to release and cause the local link to restore to normal. Relay H is energized via ft2, f1, and locks via h8, cb5, br3.

It will be noticed that the normal ringing trip circuit is through NSK and that this is now open.

Ringing from the main exchange is not tripped until after H operates. Relay LG now operates to the extension loop, and at lg3 bridges L on the junction line. L energizes followed by Z which cuts the connection through releasing LG. Relays AC, R, release, followed by F. BR holds to lg4 and z5 in turn and remains operated.

The alternative night service using Fig. 4A operates as follows. On an incoming call with key NSK thrown, relays RB, AC, R, and BR operate as before and R locks via r6, cb2.

Earth via r5, NS winding, lead VII, s2, Fig. 3, NSK, NC winding to battery causes NS and NC to energize, NS closes contacts alternative to the speak key make contacts so that CA, Fig. 1, energizes via ns1, lead IX, sd2. Relay ME, Fig. 3A, then operates via s5, lead XI, ns3 to ca4, and closes a circuit via me1 and lead XI for operating S and SD. ME locks via me4, s6, while S and SD hold via s5. CA then locks via ca3, lead VIII, to s3 and sd2 in parallel and CB operates in parallel therewith. Z operates via ns2, ns3, ca4 and prepares a ringing trip circuit via D, L, z3 and z4, z1 and z2, and the extension line. ND operates to nc5, and NS locks via ns4, lead XII, NSK to nc2.

NC may lock in either of two ways according to ringing conditions. When ringing return battery is on the positive wire (as opposed to battery on the negative wire from the junction line circuit) NC locks via MC3, ia1, NSK, DL contacts, lead XVIII, ca7, to the positive junction wire, so that if the call is abandoned NC immediately releases.

If, however, there is no direct current condition on the junction leads characteristic of ringing, as in the case of a manual main exchange, NC has an alternative locking circuit (not provided in the previous case) via mc3, ia1, and back contact of PZ in the ringing and tones circuit in parallel to back contacts nd2, sz2. As previously stated, PZ operates at half-minute intervals while the ringing and tones circuit is in use.

Interrupted earth is now connected via lead EEL, s4, sz3, nc4, y4 to operate AX which locks in series with Y via k4, nu1, s1. Contacts y4 now connect the same earth to AY which operates and locks in series with SZ to s1. Y and Z operate. As before ST operated via ax3, k5, nu1, s1 when AX energized and closed a circuit for JFM, Fig. 1 via cb4, lead III, sz4, q1, k3, st2.

JF is stopped on the night line individual to the calling junction by Q; Q, st4, nc1, lead V, ns5, contacts individual to the junction, lead II, jumper to night line, jfm4, cb2. Operation of contacts q1 cause O and K to energize in turn, since change-over of contacts o3 no longer opens the circuit of Q. Contacts k4 and k5 release ST, AX, AY, and Y, but SZ is locked via sz1, nc5.

During release of K, earth via k2, st1, lead IV, cb3, energizes RR and CL and the extension is tested by H. ST, K and O release but RR and H when operated lock via cb5, lead VI and first k1 and later st3. The extension is rung via F and on reply F releases RR at f3 and is then itself released.

Relay IA operates to the extension loop; battery, IA winding, me2, SPXT, SPXC, lead XVI, ca6, D and L windings, z4, z2, rr3, h4, jfm2, subset loop, jfm1, h3, rr2, z1, z3, L and D windings ca5, lead XV, SPXC, SPXT, me3, IA winding, earth.

Contacts ia1 release NC which releases ND, SZ, and NS (at nc2 and nd1). S and SD are released, followed by ME, CA and CB. The conversational connection is cut through and L operates, holding slow-release relay Z. Main exchange ringing is tripped, the connection is completed, and the attendant's circuit is completely released.

In the case where NC locks via back contact of PZ, opening of this contact while NC is energized releases NC, and the attendant's circuit and junction circuit return to normal. Another burst of ringing from the main exchange will then start another connection.

The attendant is provided with a junction test key JTK, Fig. 3A, operation of which energizes a relay JT controlling contacts associated with each junction speak key SK, Fig. 1. Closure of the JT contacts causes the lamps LL of all busy junctions to light via contacts br5, so that the attendant can choose an idle junction for an outgoing call. Of course back contacts of BR could replace front contacts br5 and the lamps of idle junctions only lighted.

What is claimed is:

1. In a telephone system, an exchange, incoming lines, a switch for each line, an attendant's position including a control equipment, means responsive to the operation of said attendant's control equipment for establishing a connection from an incoming line on which a call is waiting to a subscriber's line over the associated switch, night service circuit means, switching means for disabling said attendant's control equipment and enabling said night service circuit means, and means operative when a call is waiting on any incoming line and the night service circuit means is enabled for establishing a connection from said incoming line to a subscriber's line over the associated switch.

2. In a telephone system, an exchange, subscribers' lines, an incoming line, a switch, an attendant's position including a control equipment, means responsive to the operation of the attendant's control equipment for establishing a connection from the incoming line to any subscriber's line over said switch, night service circuit means, switching means for disabling said attendant's control equipment and enabling said night service circuit means, and means responsive to the dialing of a certain digit by the subscriber of any line when said night service circuit means is effective and a call is waiting on the incoming line for actuating said switch to connect the dialing subscriber's line to the incoming line.

3. In a telephone system, an exchange, subscribers' lines, an incoming line, a switch, an attendant's position including a control equipment, means responsive to the operation of the attendant's control equipment for establishing a connection from said incoming line to any subscriber's line over said switch, night service circuit means, switching means for disabling the attendant's control equipment and enabling the night service circuit means, and means responsive to the dialing of a certain digit by the subscriber of any line when said night service circuit means is enabled and a call is waiting on said incoming line for actuating said switch to hunt for the dialing subscriber's line and connect it with said incoming line.

4. In a telephone system, an exchange, subscribers' lines, an incoming line, a switch, an attendant's position including a control equipment, means responsive to the operation of the attendant's control equipment for establishing a connection from said incoming line to any subscriber's line over said switch, night service circuit means, switching means for disabling the attendant's control equipment and enabling the night service circuit means, means responsive to the dialing of a certain digit by the subscriber of any line when said night service circuit means is enabled and a call is waiting on said incoming line for actuating said switch to hunt for the dialing subscriber's line and connect it with said incoming line, and means for releasing said last-mentioned connection between the incoming line and said subscriber's line and for establishing a connection from said incoming line to another subscriber's line.

5. In a telephone system, an exchange, subscribers' lines, switches, incoming lines each terminating in an individual switch, an attendant's position including a control equipment, means responsive to the operation of the attendant's control equipment for establishing a connection from a calling incoming line through the associated switch to any subscriber's line, night service circuit means, switching means for disabling said attendant's control equipment and enabling the night service circuit means, and means responsive to a call on any incoming line when the night service circuit means is enabled for connecting said incoming line to a particular subscriber's line over the associated switch.

6. In a telephone system, an exchange, subscribers' lines, switches, incoming lines each terminating in an individual switch, an attendant's position including a control equipment, means responsive to the operation of the attendant's control equipment for establishing a connection from a calling incoming line through the associated switch to any subscriber's line, night service circuit means, switching means for disabling said attendant's control equipment and enabling the night service circuit means, means responsive to a call on any incoming line when the night service circuit means is enabled for connecting said incoming line to a particular subscriber's line over the associated switch, a relay for each incoming line, means responsive to a call on any incoming line when the night service circuit is enabled for actuating the corresponding relay, and means operative on the actuation of said relay for actuating the switch associated with said incoming line to connect said line with a particular subscriber's line.

ESMOND P. G. WRIGHT.
GEORGE C. HARTLEY.